United States Patent
Gupta et al.

(10) Patent No.: US 11,599,253 B2
(45) Date of Patent: Mar. 7, 2023

(54) SYSTEM AND METHOD FOR SELECTION OF DISPLAYED OBJECTS BY PATH TRACING

(71) Applicant: Rovi Guides, Inc., San Jose, CA (US)

(72) Inventors: Vikram Makam Gupta, Karnataka (IN); Johnson Josephraj, Tamilnadu (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/086,084

(22) Filed: Oct. 30, 2020

(65) Prior Publication Data
US 2022/0137794 A1    May 5, 2022

(51) Int. Cl.
*G06F 3/04842*    (2022.01)
(52) U.S. Cl.
CPC ................ *G06F 3/04842* (2013.01)
(58) Field of Classification Search
CPC .................................................. G06F 3/04842
See application file for complete search history.

(56) References Cited

U.S. PATENT DOCUMENTS

| | | | | |
|---|---|---|---|---|
| 5,734,893 A * | 3/1998 | Li | ............... | G06F 16/2462 707/694 |
| 6,057,833 A * | 5/2000 | Heidmann | ............... | G11B 27/034 345/474 |
| 6,741,655 B1 * | 5/2004 | Chang | ............... | G06F 16/7857 375/240.26 |
| 7,072,398 B2 * | 7/2006 | Ma | ............... | H04N 19/51 348/416.1 |
| 7,911,482 B1 * | 3/2011 | Mariano | ............... | G11B 27/34 345/676 |
| 8,027,512 B2 * | 9/2011 | Jaspers | ............... | G06F 16/71 382/103 |
| 8,134,597 B2 * | 3/2012 | Thorn | ............... | H04N 5/232127 348/169 |
| 8,447,752 B2 * | 5/2013 | Wang | ............... | G06F 16/5866 707/711 |
| 8,553,778 B2 * | 10/2013 | Desimone | ............... | G06K 9/481 375/240.16 |

(Continued)

OTHER PUBLICATIONS

U.S. Appl. No. 17/086,088, filed Oct. 30, 2020, Vikram Makam Gupta.

*Primary Examiner* — Jeremy L Stanley
(74) *Attorney, Agent, or Firm* — Haley Guiliano LLP

(57) ABSTRACT

Systems and methods for selecting objects by tracing the paths the objects traverse on a display. An object moving across a display screen does so along a particular path. Users may trace the shape of this path, such as by outlining the shape of the path with their finger or other device on a touch sensitive screen, moving a cursor with, e.g., a mouse, moving a motion-sensitive screen, or the like. The display may match the shape of the user's traced path to the shape of an object's path. Objects whose paths are shaped sufficiently similar to the user's traced path may then be selected. In this manner, users may select an object by tracing the path it takes, rather than directly picking or touching the object itself. This allows users an additional method for selecting displayed objects, improving the flexibility of many displays and programs run thereon.

19 Claims, 10 Drawing Sheets

(56) References Cited

U.S. PATENT DOCUMENTS

| | | | | |
|---|---|---|---|---|
| 8,688,675 B2* | 4/2014 | Albers | G06F 16/786 | 707/706 |
| 8,811,673 B1* | 8/2014 | Fleites | H04N 21/44008 | 382/103 |
| 8,873,930 B2* | 10/2014 | Deglise | H04N 21/42224 | 386/241 |
| 8,941,733 B2* | 1/2015 | Albers | G06F 16/7837 | 348/143 |
| 8,947,355 B1 | 2/2015 | Karakotsios | | |
| 9,268,794 B2* | 2/2016 | Cui | H04N 5/23254 | |
| 10,083,537 B1* | 9/2018 | Moore | G06F 3/0488 | |
| 10,229,325 B2* | 3/2019 | Povar | G06F 16/7328 | |
| 10,262,691 B1* | 4/2019 | Gilmour | H04N 21/6587 | |
| 10,942,635 B1* | 3/2021 | Rakshit | G06F 3/0482 | |
| 2002/0114394 A1* | 8/2002 | Ma | H04N 19/51 | 375/240.16 |
| 2002/0181741 A1* | 12/2002 | Masukura | G06T 7/20 | 382/103 |
| 2004/0119744 A1* | 6/2004 | Chan | G06F 3/04812 | 715/763 |
| 2005/0280657 A1* | 12/2005 | Hori | G06T 7/246 | 345/619 |
| 2006/0012681 A1* | 1/2006 | Fujii | H04N 7/181 | 348/169 |
| 2006/0017692 A1 | 1/2006 | Wehrenberg et al. | | |
| 2006/0094502 A1* | 5/2006 | Katayama | A63F 13/2145 | 463/31 |
| 2006/0256210 A1* | 11/2006 | Ryall | H04N 21/854 | 348/231.2 |
| 2008/0316311 A1* | 12/2008 | Albers | G06F 16/7837 | 348/143 |
| 2009/0276711 A1* | 11/2009 | Figueroa | G06F 16/745 | 715/719 |
| 2010/0141826 A1* | 6/2010 | Thorn | H04N 5/232127 | 348/345 |
| 2010/0169330 A1* | 7/2010 | Albers | G06F 16/7335 | 707/754 |
| 2011/0052144 A1* | 3/2011 | Abbas | H04N 21/23418 | 386/240 |
| 2011/0106833 A1* | 5/2011 | Albers | G06F 16/786 | 707/769 |
| 2011/0205359 A1* | 8/2011 | Lee | G06T 7/285 | 348/143 |
| 2012/0072410 A1 | 3/2012 | Wang et al. | | |
| 2012/0106794 A1* | 5/2012 | Iwasaki | G06T 7/215 | 382/103 |
| 2013/0108177 A1* | 5/2013 | Sukthankar | G06K 9/6215 | 382/218 |
| 2013/0346599 A1* | 12/2013 | Wilson | H04L 67/22 | 709/224 |
| 2014/0029914 A1* | 1/2014 | Deglise | G11B 27/34 | 386/241 |
| 2014/0064706 A1* | 3/2014 | Lewis, II | H04N 5/93 | 386/278 |
| 2014/0152836 A1* | 6/2014 | Morris | G06T 7/292 | 348/159 |
| 2014/0205148 A1* | 7/2014 | Hirano | H04N 5/76 | 382/103 |
| 2014/0307150 A1 | 10/2014 | Sakamoto et al. | | |
| 2015/0229996 A1* | 8/2015 | Jo | H04N 21/6125 | 725/37 |
| 2015/0279425 A1* | 10/2015 | Goranson | G11B 27/102 | 386/230 |
| 2015/0379728 A1* | 12/2015 | Conze | H04N 19/58 | 382/107 |
| 2016/0034477 A1* | 2/2016 | Mao | G06K 9/00758 | 386/353 |
| 2016/0118080 A1* | 4/2016 | Chen | G06T 7/20 | 386/344 |
| 2016/0275986 A1* | 9/2016 | Nord | G06F 3/04883 | |
| 2016/0343147 A1* | 11/2016 | Nukaga | G06K 9/4671 | |
| 2017/0358023 A1* | 12/2017 | Peterson | G06Q 30/06 | |
| 2018/0213358 A1* | 7/2018 | Shen | H04N 7/185 | |
| 2018/0247131 A1* | 8/2018 | Povar | G06K 9/00724 | |
| 2019/0007699 A1* | 1/2019 | Liu | H04N 19/44 | |
| 2019/0215571 A1* | 7/2019 | Mihajlovic | H04N 21/4725 | |
| 2019/0369944 A1* | 12/2019 | Dubey | G06F 3/04842 | |
| 2020/0279381 A1* | 9/2020 | Uesugi | G08B 13/19645 | |
| 2020/0329193 A1* | 10/2020 | Selig | H04N 5/23216 | |
| 2022/0137700 A1 | 5/2022 | Gupta et al. | | |

* cited by examiner

SYSTEM AND METHOD FOR SELECTION OF DISPLAYED OBJECTS BY PATH TRACING

BACKGROUND

The present disclosure relates generally to display systems. More specifically, the present disclosure relates to systems and methods for selection of displayed objects.

SUMMARY

Various devices and software allow for pointing to and selecting displayed objects. A computer mouse that allows users to move a displayed cursor to select other displayed objects is one popular example. Touch sensitive displays that allow users to touch displayed objects are another example. Such devices and their associated methods of use are not without drawbacks, however. Selection of objects in this manner may be challenging if the object is moving, particularly if the object is moving quickly or unpredictably. Object selection is also impossible once the object has moved off the display area.

Accordingly, to overcome the limited ability of computer based display systems to allow users to select displayed objects, systems and methods are described herein for a computer-based process that allows users to select objects projected by a display, by tracing the path traversed by the object rather than pointing to or touching the object itself. A user may trace the shape of the path taken by a moving object, and the system may compare this traced path to the paths of displayed objects. A sufficient match between the traced path and an object path may indicate that the user wishes to select that object, prompting the system to select that object for the user. Thus, embodiments of the disclosure allow users to select objects by merely tracing the paths they take, rather than precisely targeting the object with a cursor, a touch, or the like. This allows for easier selection of objects that may be difficult to precisely target.

In some embodiments of the disclosure, objects may be selected according to the path they traverse during a predetermined window or period of time. As one example, a time window during which the object appeared on screen may be selected, and the path that the object traversed during that time window may be used as the path from which selection may be determined. The time window may be any period of time, e.g., a most recent time period of any duration, a time period beginning at a time the object first appeared on screen, or the like. This time period may be of any duration.

The path traced by the user may be compared to the path traversed by the object during this time period. If the path traced does not sufficiently match the path traversed by the object in the time period, it may be the case that the selected time period did not capture enough of the object path to allow for a sufficient match. Accordingly, if no match exists between a traced path and the path traversed by the object during a particular time window, the window may be increased to capture a longer, or perhaps more representative, path. Matches may then be determined with respect to the longer path traversed during this increased time window. If still no match occurs, this process may be repeated as desired, with the time window being successively increased until, for example, a match is found or the process is terminated.

Once determined, the traversed path may be stored for retrieval and use, such as by comparing paths traced by a user, in any manner. In some embodiments of the disclosure, for example, traversed paths may be stored as metadata of the video or other content containing the displayed object.

Matches between traced and traversed paths may be determined in any manner. In some embodiments of the disclosure, such matches may be determined by first identifying shapes of the traced and traversed paths, and comparing the shapes to each other. Sufficiently similar shapes may indicate a match, while dissimilar shapes may not be matched. As one example, shapes within traced and traversed paths may be identified and compared. For instance, geometric shapes such as arcs, lines, loops, and the like may be identified in any manner, and their properties may be compared to determine whether geometric shapes of traced paths are sufficiently similar to corresponding shapes of traversed paths. As another example, corresponding points of traced and traversed paths may be compared to determine their degree of deviation from each other. Embodiments of the disclosure contemplate determination of matches according to any comparison of points or features of traced and traversed paths.

Further, embodiments of the disclosure contemplate detection and comparison of paths that are traced along different directions than those paths traversed by objects. That is, systems of embodiments of the disclosure may allow users to trace paths along any direction, and these traced paths may be compared to any traversed path regardless of its direction. Thus, for example, a traced path may be used to identify an object even if the traced path lies along a direction different from that in which the object moves. For instance, while a vertically-moving object may traverse a generally vertical path along a display, users may trace a similar-shaped horizontal path, with the system comparing the shapes of the traced and traversed paths to determine a match, rather than their directions.

It is also noted that traced paths need not necessarily be traced along the paths traversed by objects, but may instead be traced anywhere on the display. That is, paths may be traced either along the paths traversed by objects intended to be selected, or along any other portion of the display. Accordingly, embodiments of the disclosure allow users to trace a path along any area of a display, where this path may be used to select an object traversing a path extending along any other area of the display. Traced and traversed paths may be compared according to their shapes, rather than their locations, with sufficiently similarly shaped traced and traversed paths indicating a selected object regardless of where those paths occur on the display.

It is further noted that traced paths need not necessarily correspond to actual physical paths traversed by an object on a display. Rather, traced paths may represent figurative or representative paths traversed by an object during the course of content play. For example, if a vehicle travels from east to west (i.e., right to left on the display) within content such as a movie, a user may swipe from right to left in the direction that the vehicle traveled in the movie. Embodiments of the disclosure would thus allow for matching between this swipe and the vehicle's overall geographic travel during the movie. Accordingly, embodiments of the disclosure allow for selection of objects according to their actual paths traversed on a display, their geographic or other figurative paths traversed within the storyline of their content, and the like.

Embodiments of the disclosure contemplate path tracing in any manner. As one example, traced paths may be input to touch-sensitive displays by simply tracing a path using a finger, stylus, or the like. As another example, paths may be traced with a cursor manipulated by a user via, e.g., a computer mouse or other input device. As a further example, paths may be input via motion-sensitive devices. For instance, tablet or mobile computing devices often contain accelerometers or other sensors capable of detecting motion such as device rotation or translation. Users may accordingly move a displayed cursor by translating or rotating the device, with this cursor motion tracing a path by which objects are selected. As above, a path may be traced by cursor motion from device movement. This traced path may then be compared to the paths of various on-screen objects, and objects may be selected according to matching paths.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for selecting objects by tracing the paths the objects traverse on a display. For example, an object moving across a display screen does so along a particular path. Users may trace the shape of this path, such as by outlining the shape of the path with their finger or other device on a touch sensitive screen, moving a cursor with, e.g., a mouse, moving a motion-sensitive screen, or the like. The display may match the shape of the user's traced path to the shape of an object's path. Objects whose paths are shaped sufficiently similar to the user's traced path may then be selected. In this manner, users may select an object by tracing the path it takes, rather than directly picking or touching the object itself. This allows users an additional method for selecting displayed objects, improving the flexibility of many displays and programs run thereon.

Figure 1A:
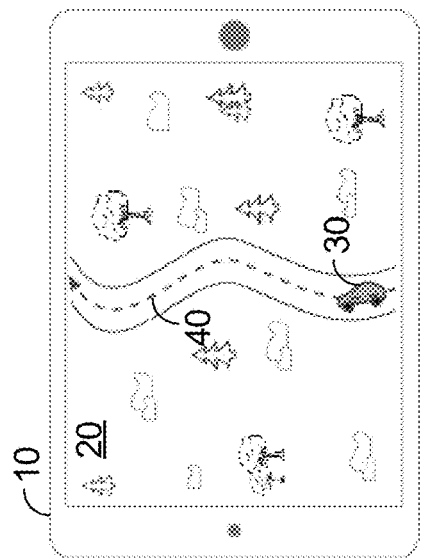
FIGS. 1A-1G conceptually illustrate operation of an exemplary system for selection of displayed objects by path tracing, in accordance with embodiments of the disclosure.
Figure 1B:
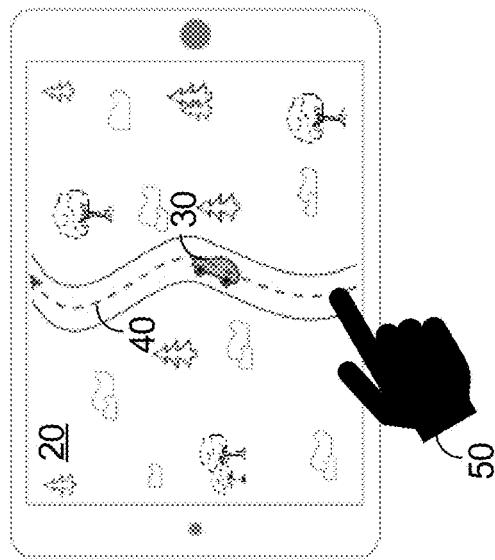
Figure 1C:
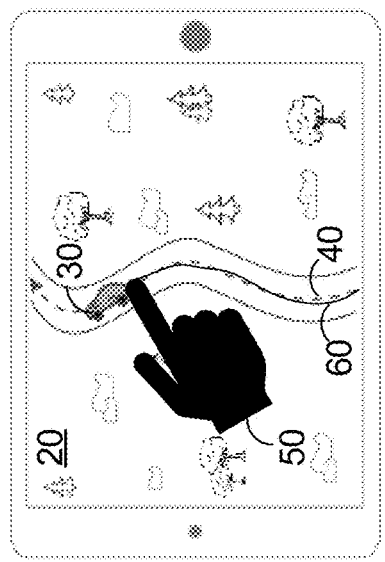

FIGS. 1A-1G conceptually illustrate operation of an exemplary system for selection of displayed objects by path tracing, in accordance with embodiments of the disclosure. As shown in FIGS. 1A-1C, a device 10, which may be for example a tablet computing device, smartphone, or the like, has a display 20 upon which are displayed various objects such as object 30, shown here as a vehicle. The object 30 moves across the display, such as when the object 30 is an object appearing in content such as a movie or show.

The object 30 traverses a path 40 as it moves across the display 20. A user's finger 50 may thus follow the path 40 of the object 30, such as by touching the display 20 and dragging this contact along the path 40, as shown. If the path 60 traced by the user 50 is sufficiently similar to the path 40 traversed by object 30, the object 30 is selected for the user, whereupon various operations may be performed as desired by the user.

Figure 1D:
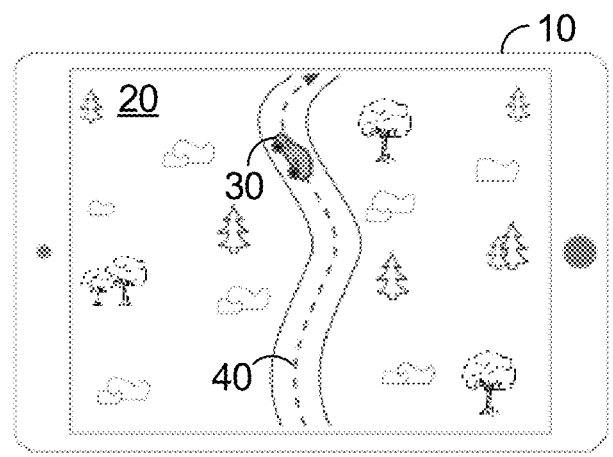
Figure 1E:
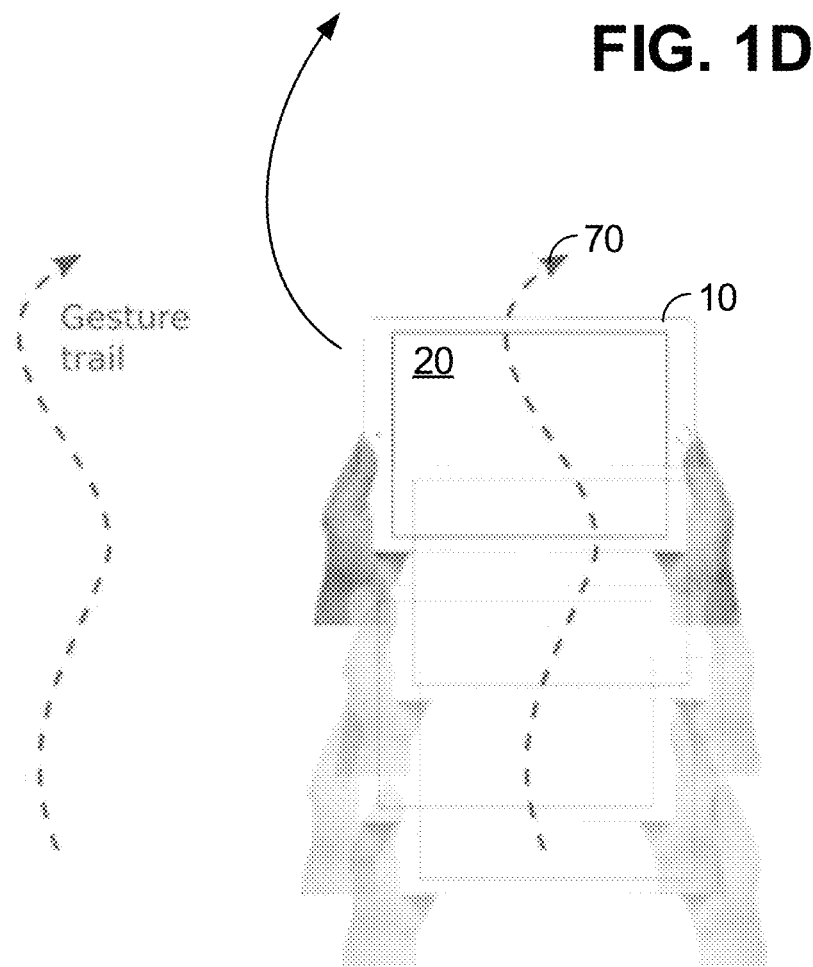

FIGS. 1A-1C illustrate tracing of paths 60 by touch input to display 20. As above, however, embodiments of the disclosure contemplate input of paths 60 in any manner. FIGS. 1D-1E illustrate another such example, in which paths 60 are input via physical manipulation of a motion-sensitive display. Here, a device 10 may have a cursor or other screen element programmed to move according to tilting of device 10. Accordingly, a user may tilt the device 10 left or right in the view of FIG. 1E (i.e., about an axis that extends vertically in the view of FIG. 1E), to trace the leftward and rightward movement of path 70, and may tilt the device 10 forward (about a horizontal axis in the view of FIG. 1E) to trace the forward movement of path 70. Thus, tilting of the device 10 about its various axes may advance a cursor or other displayed indicator, to trace path 70, mimicking path 40 and thereby selecting object 30.

Figure 1F:
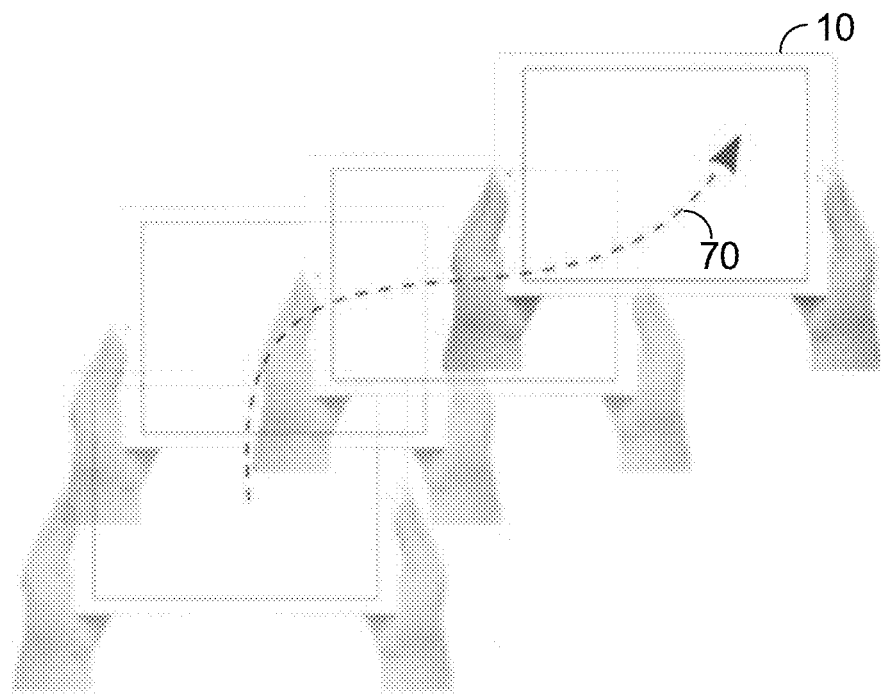
Figure 1G:
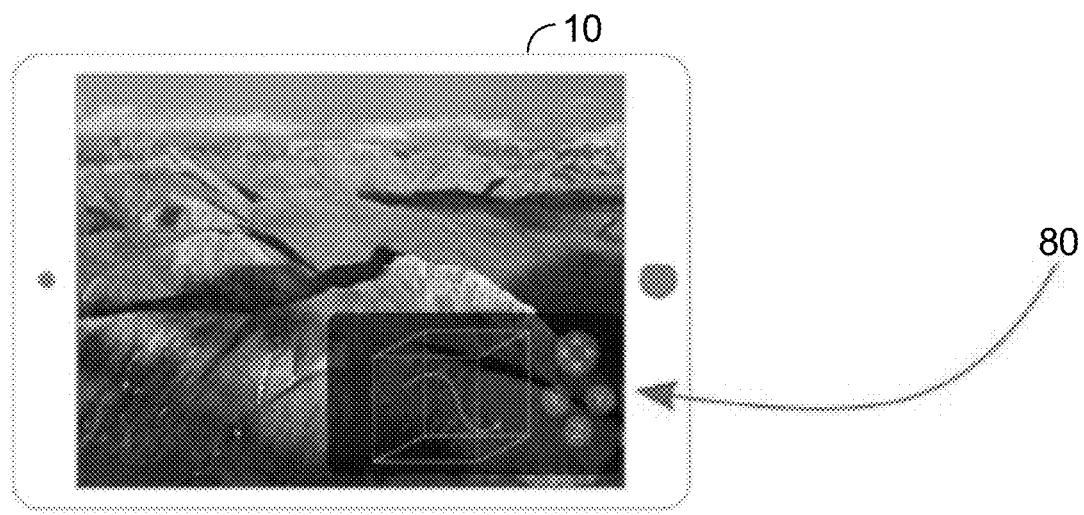

FIGS. 1F-1G illustrate tracing of path 70 by translation as well as the rotation of FIGS. 1D-1E. In particular, display 20 may be translated in a manner that follows the path of a displayed object, to trace a path 70. This path 70 may then be compared to paths traversed by displayed objects, to determine a match and thus select the corresponding object.

As above, path 70 may be traced by translation (and rotation) of device 10 to manipulate a cursor or other displayed indicator along path 70. Alternatively, an interface 80 may be displayed on display 20, allowing users to control movement of this cursor or indicator. More specifically, interface 80 may contain buttons allowing users to control cursor movement and trace paths. Accordingly, embodiments of the disclosure contemplate user tracing of paths 60, 70 in any manner, including via touch, by manual manipulation of a motion-sensitive display, or by manipulation of a cursor or displayed indicator via an interface, a device such as a mouse, or the like.

Figure 2:
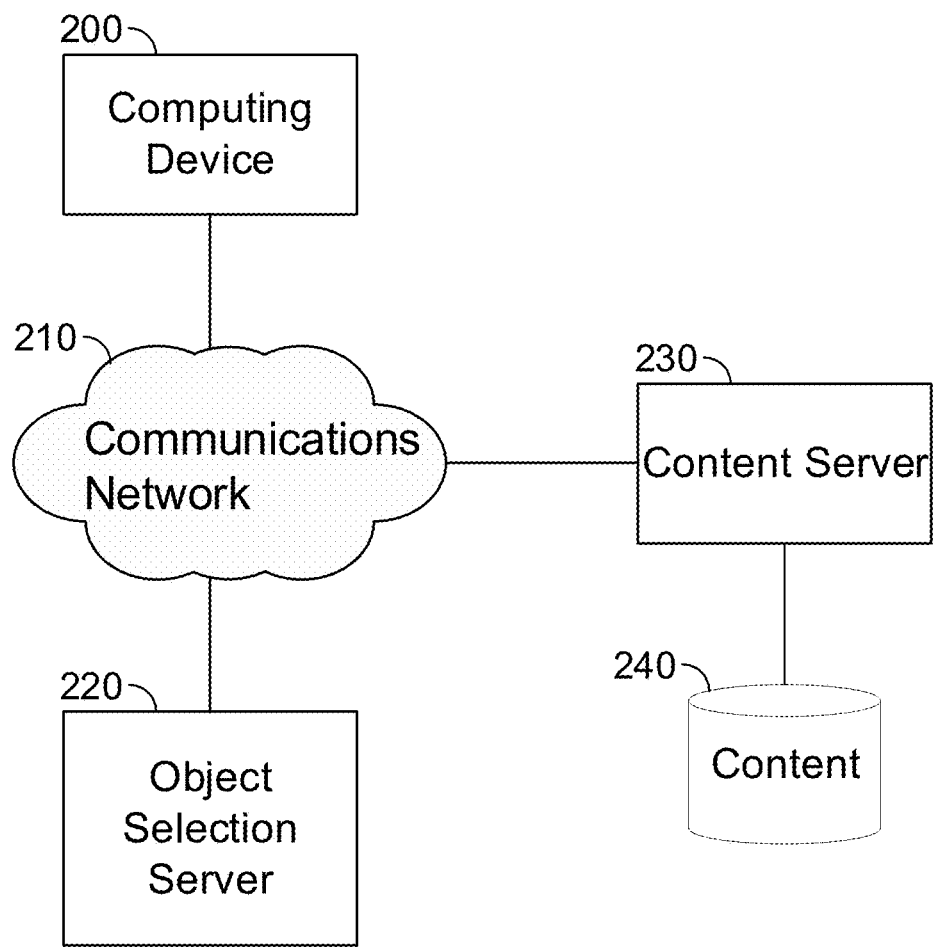
FIG. 2 is a block diagram illustration of a system for implementing selection of displayed objects by path tracing, in accordance with embodiments of the disclosure.

FIG. 2 is a block diagram illustration of a system for implementing selection of displayed objects by path tracing, in accordance with embodiments of the disclosure. A computing device 200 may be in communication with an object selection server 220 through, for example, a communications network 210, object selection server 220 is also in electronic communication with content server 230 also through, for example, the communications network 210. Computing device 200 may be any computing device running a user interface, such as a voice assistant, voice interface allowing for voice-based communication with a user, or an electronic content display system for a user. Examples of such computing devices are a smart home assistant similar to a Google Home® device or an Amazon® Alexa® or Echo® device, a smartphone or laptop computer with a voice interface application for receiving and broadcasting information in voice format, a set-top box or television running a media guide program or other content display program for a user, or a server executing a content display application for generating content for display or broadcast to a user. Object selection server 220 may be any server running a path tracing and object selection application, including modules for implementing processes of embodiments of the disclosure. Content server 230 may be any server programmed to search for electronic content responsive to queries processed by the object selection server 220. For example, content server 230 may be a server programmed to search content database 240 for content, and to return selected content or representations thereof to one or more of object selection server 220 or computing device 200.

The computing device 200 may be any device capable of displaying content, selecting objects therein, and engaging in electronic communication with server 220. For example, computing device 200 may be a voice assistant, smart home assistant, digital TV running a content display interface, laptop computer, smartphone, tablet computer, or the like.

Figure 3:
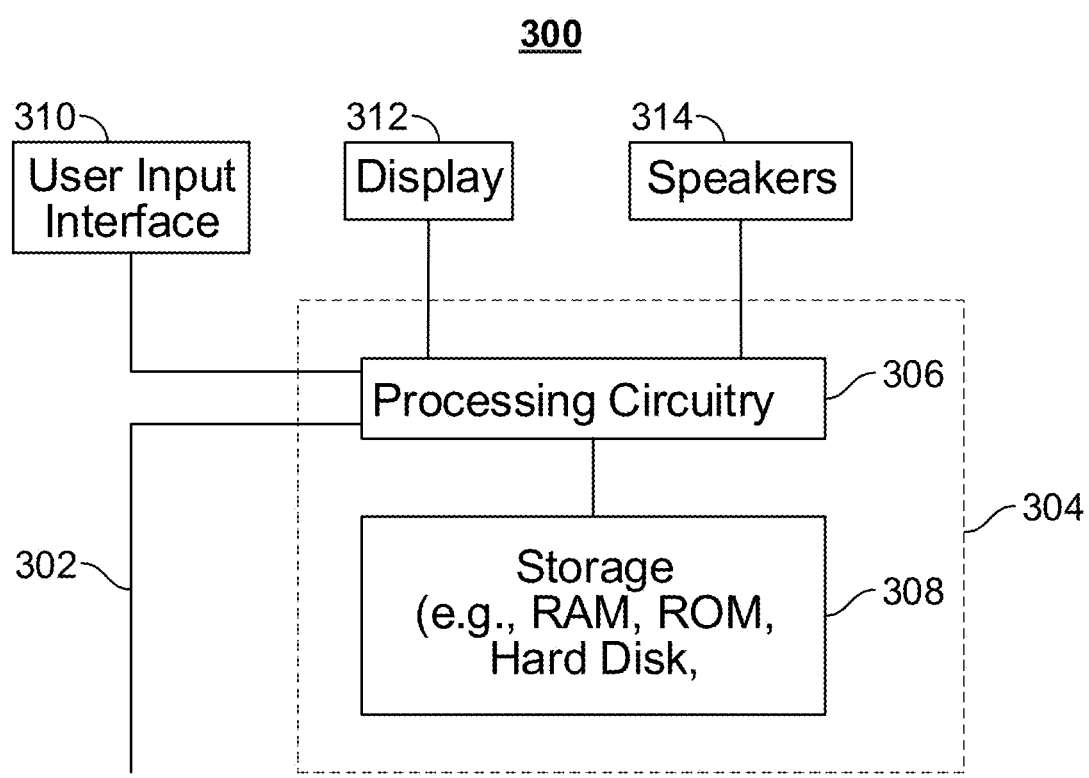
FIG. 3 is a generalized embodiment of illustrative electronic computing devices constructed for use according to embodiments of the disclosure.

FIG. 3 shows a generalized embodiment of an illustrative user equipment device 300 that may serve as a computing device 200. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for receiving streamed content and executing its display, such as executing application programs that provide interfaces for content providers to stream and display content on display 312.

Control circuitry 304 may thus include communications circuitry suitable for communicating with ASR server 220, content search server 230, or any other networks or servers. Communications circuitry may include a cable modem, an integrated services digital network (ISDN) modem, a digital subscriber line (DSL) modem, a telephone modem, an Ethernet card, or a wireless modem for communication with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other.

Memory may be an electronic storage device provided as storage 308, which is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage may be used to supplement storage 308 or instead of storage 308.

Storage 308 may also store instructions or code for an operating system and any number of application programs to be executed by the operating system. In operation, processing circuitry 306 retrieves and executes the instructions stored in storage 308, to run both the operating system and any application programs started by the user. The application programs can include one or more voice interface applications for implementing voice communication with a user, and/or content display applications that implement an interface allowing users to select and display content on display 312 or another display.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general-purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch-screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Figure 4:
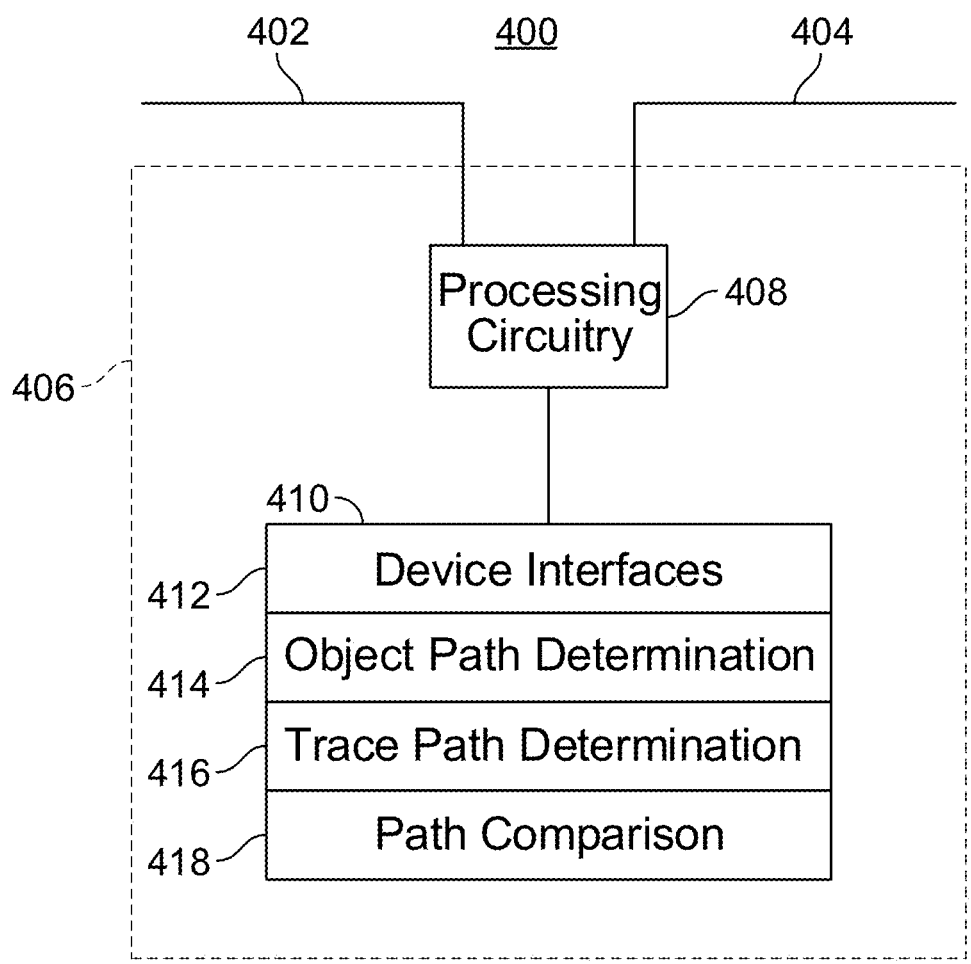
FIG. 4 is a generalized embodiment of an illustrative ASR server constructed for use according to embodiments of the disclosure.

FIG. 4 is a generalized embodiment of an illustrative object selection server 220 constructed for use according to embodiments of the disclosure. Here, device 400 may serve as an ASR server. Device 400 may receive content and data via I/O paths 402 and 404. I/O path 402 may provide content and data to the various devices 200, 230, while I/O path 404 may provide data to, and receive content from, one or more content search servers 230. Like the user equipment device 300, the device 400 has control circuitry 406, which includes processing circuitry 408 and storage 410. The control circuitry 406, processing circuitry 408, and storage 410 may be constructed, and may operate, in a similar manner to the respective components of user equipment device 300.

Storage 410 is a memory that stores a number of programs for execution by processing circuitry 408. In particular, storage 410 may store a number of device interfaces 412, an object path determination module 414, trace path determination module 416 for determining paths traced by users to select displayed objects, and path comparison module 418. The device interfaces 412 are interface programs for handling the exchange of commands and data with the various devices 200. Object path determination module 414 is one or more programs for determining the paths traversed by objects on their displays. As above, object path determination module 414 determines paths traversed by various displayed content objects, as the content is being played. Trace path determination module 416 includes code for executing all of the above described functions for detecting and determining paths traced by users on a display. Path comparison module 418 is a module for performing the above-described comparison between object paths output by object path determination module 414, and user-traced paths output by trace path determination module 416. Path comparison module 418 may determine shapes of the paths traversed by objects and paths traced by users, and compare the shapes to determine which object to select. While the modules 414-418 are shown as residing in device 400, any one or more of them may alternatively reside on any other computing device. For example, object path determination module 414, trace path determination module 416, and/or path comparison module 418 may reside on device 200, to carry out various path determination and comparison operations locally rather than on device 400.

The device 400 may be any electronic device capable of electronic communication with other devices and performance of ASR error correction processes described herein. For example, the device 400 may be a server, or a networked in-home smart device connected to a home modem and thereby to various devices 200. The device 400 may alternatively be a laptop computer or desktop computer configured as above.

Figure 5:
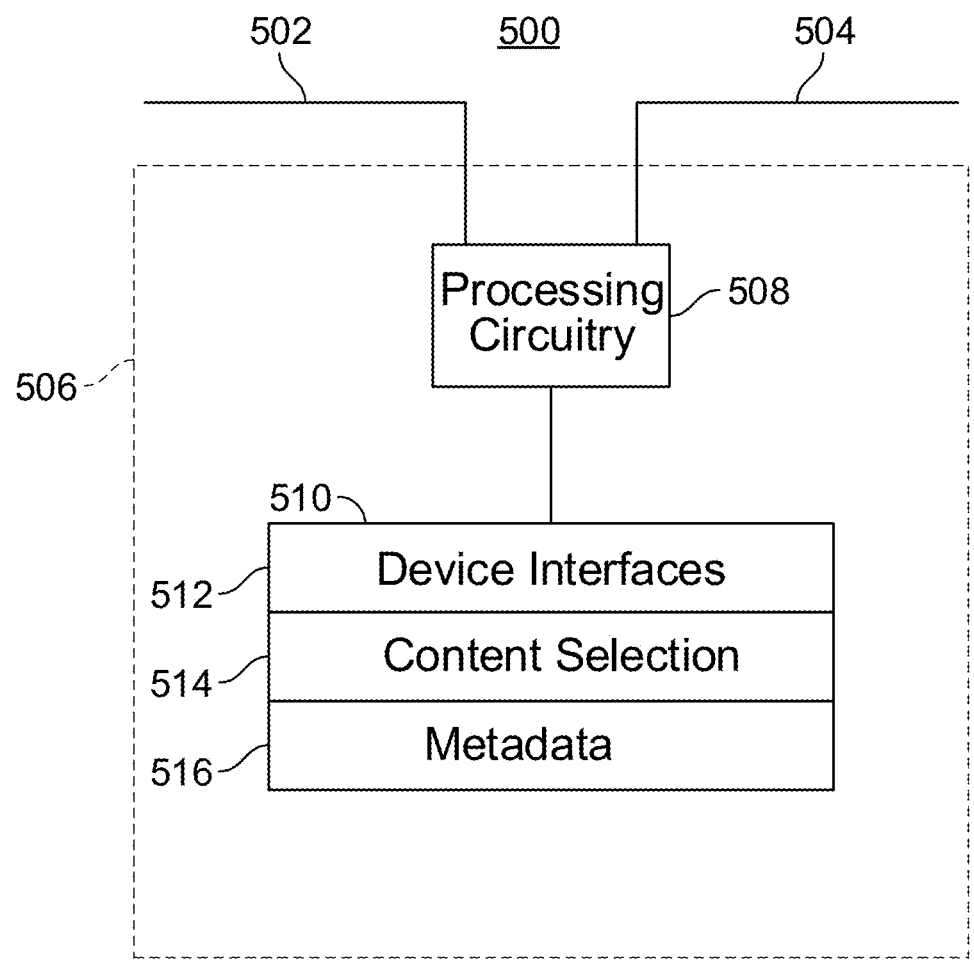
FIG. 5 is a generalized embodiment of an illustrative content search server constructed for use according to embodiments of the disclosure.

FIG. 5 is a generalized embodiment of an illustrative content server 230 constructed for use according to embodiments of the disclosure. Here, device 500 may serve as a content search server. Device 500 may receive content and data via I/O paths 502 and 504. I/O path 502 may provide content and data to the various devices 200 and/or server 220, while I/O path 504 may provide data to, and receive content from, content database 240. Like the device 400, the device 500 has control circuitry 506, which includes processing circuitry 508 and storage 510. The control circuitry 506, processing circuitry 508, and storage 510 may be constructed, and may operate, in a similar manner to the respective components of device 400.

Storage 510 is a memory that stores a number of programs for execution by processing circuitry 508. In particular, storage 510 may store a number of device interfaces 512, a content selection module 514, and a metadata module 516 for storing metadata determined according to the processes described herein. The device interfaces 512 are interface programs for handling the exchange of commands and data with the various devices 200. Content selection module 514 identifies and retrieves content from content database 240 responsive to requests from object selection server 220 or other servers. Metadata module 516 appends traversed paths of objects to their corresponding content as metadata, for subsequent retrieval and comparison to traced paths.

Any of the various modules and functions of servers 220 and 230 may reside on any one or more devices. For example, ASR functionality and content search functionality may be combined on the same server, or even within computing device 200.

Figure 6:
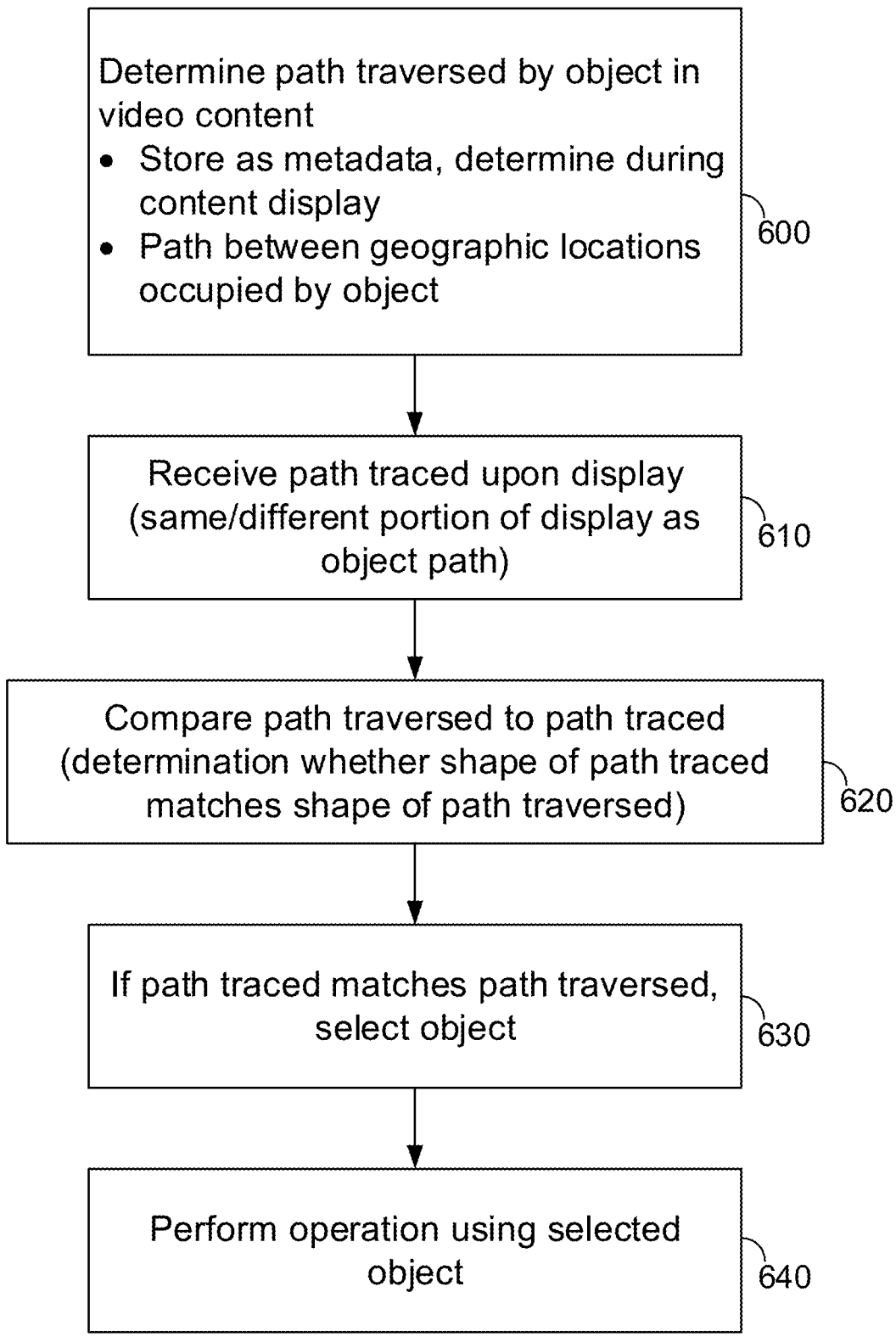
FIG. 6 is a flowchart illustrating processing steps for selecting displayed objects by path tracing, in accordance with embodiments of the disclosure.

FIG. 6 is a flowchart illustrating processing steps for selecting displayed objects by path tracing, in accordance with embodiments of the disclosure. Here, paths traversed by objects in video content are first determined (Step 600). In some embodiments of the disclosure, object path determination may be carried out prior to display. As an example, object path determination module 414 of server 220 may identify and determine the paths objects take as they traverse within content. Object identification may be via any approach, such as known object identification processes employing neural networks or other machine learning models trained to recognize and identify various objects commonly appearing in content. Alternatively, object identification may be carried out using known geometric or photometric object recognition processes that compare objects in content to stored templates of various common objects or object categories.

Object path determination module 414 then tracks the paths of identified objects as they travel within content, recording the paths taken as display coordinates as a function of time, or content time index. These determined paths may then be stored as metadata associated with the particular content, such as by conversion to metadata by metadata module 516, and storage in content database 240.

Determined object paths may be literal paths, i.e., a tracking of points or coordinates occupied by objects over time, or may be figurative paths, such as determinations of places traveled by objects over the course of content display. For example, objects such as people may move from a first city to a second during the course of a story. This movement may be represented on a map or other geographic representation as an arc or line originating at the first city and terminating at the second city. Accordingly, object path determination module 414 may determine the coordinates of this arc or line on a representative map scaled to the display 20. These arc/line coordinates may then be stored as metadata by module 516 in content database 240, along with the determined metadata of the object's literal paths taken within content, for use in object selection.

In further embodiments of the disclosure, object path determination may be carried out in substantial real time, as content is being displayed on display 20. That is, object path determination module 414 may perform object identification and path determination, optionally instructing detected paths to be stored as metadata as above, as well as retaining them in local memory for use in object selection.

Once object paths are determined, a device 10 or 200 may receive a path traced upon display 20 by a user (Step 610). In particular, device 10 or 200 may detect a path traced by a user's finger, a cursor, or the like. This path may be traced along the path traversed by the object in content display, or may be traced along any other portion of display 20.

The detected path traced by the user is then compared to paths traversed by objects in the content being played (Step 620). Comparison between traced and traversed paths may be performed in any suitable manner. As one example, traced paths may be successively compared to most recent segments, or any other recently-occurring segments, of each currently-displayed object's traversed path. In some embodiments of the disclosure, path comparison may be performed by comparison of constituent shapes of the traced and traversed paths. In particular, shapes of user-traced paths may be identified using known neural networks or other machine learning models trained to classify traced segments as being particular predetermined shapes such as arcs, portions of circles, lines, vertices, and the like. Path shapes may alternatively be identified using known landmark or feature extraction processes that determine characteristic features and their relative positions.

The sizes and positions of identified shapes may be compared to corresponding shapes of traversed object paths, in any manner. For example, corresponding shapes of traced and traversed paths may be compared by determining whether they are of the same type (with determination of no match if sufficient numbers of identified shapes are of differing types) and of sufficiently similar size and relative location. Any criteria for determining similarity of traced and traversed path shapes may be employed.

Path comparison may be performed in any other manner as well. For example, distances between corresponding points of traced and traversed paths may be determined, with a match determined if distances lie within any predetermined metric, such as aggregate distance between points, maximum distance, average distance, or the like. Embodiments of the disclosure contemplate comparison of traced and traversed paths in any suitable manner.

If the traced path is determined to match a path traversed by a displayed object (Step 630), the device 10 may select that object for the user, whereupon the user may perform or initiate any operation using the selected object (Step 640). Operations may include, for example, copying the image of the selected object, viewing or retrieving its associated metadata to determine properties of the object, or the like. Any operation is contemplated.

It is noted that traced paths may be made upon any portion of display 20, in any orientation or direction. Accordingly, embodiments of the disclosure allow users to trace paths along portions of the display other than where the actual path is displayed, and in orientations different from the orientation of the displayed path, with object selection occurring anyway. For example, a vertically-moving object may traverse a generally vertical path along a display, but users may trace a similar-shaped horizontal path at a different location on display 20, with the system comparing the shapes of the traced and traversed paths to determine a match and select the vertically-moving object.

Comparison between traced and traversed paths may result in no match. That is, the traced path may be insufficiently similar to any path traversed by the displayed objects. In this case, some embodiments of the disclosure contemplate successively increasing the time window used to determine an object's traversed path, to identify a longer path segment for comparison. In other words, the user-entered traced path is successively compared to longer and longer portions of the traversed paths when no match is determined, in case the reason that no match was found is that insufficient portions of the traversed paths were examined.

Figure 7:
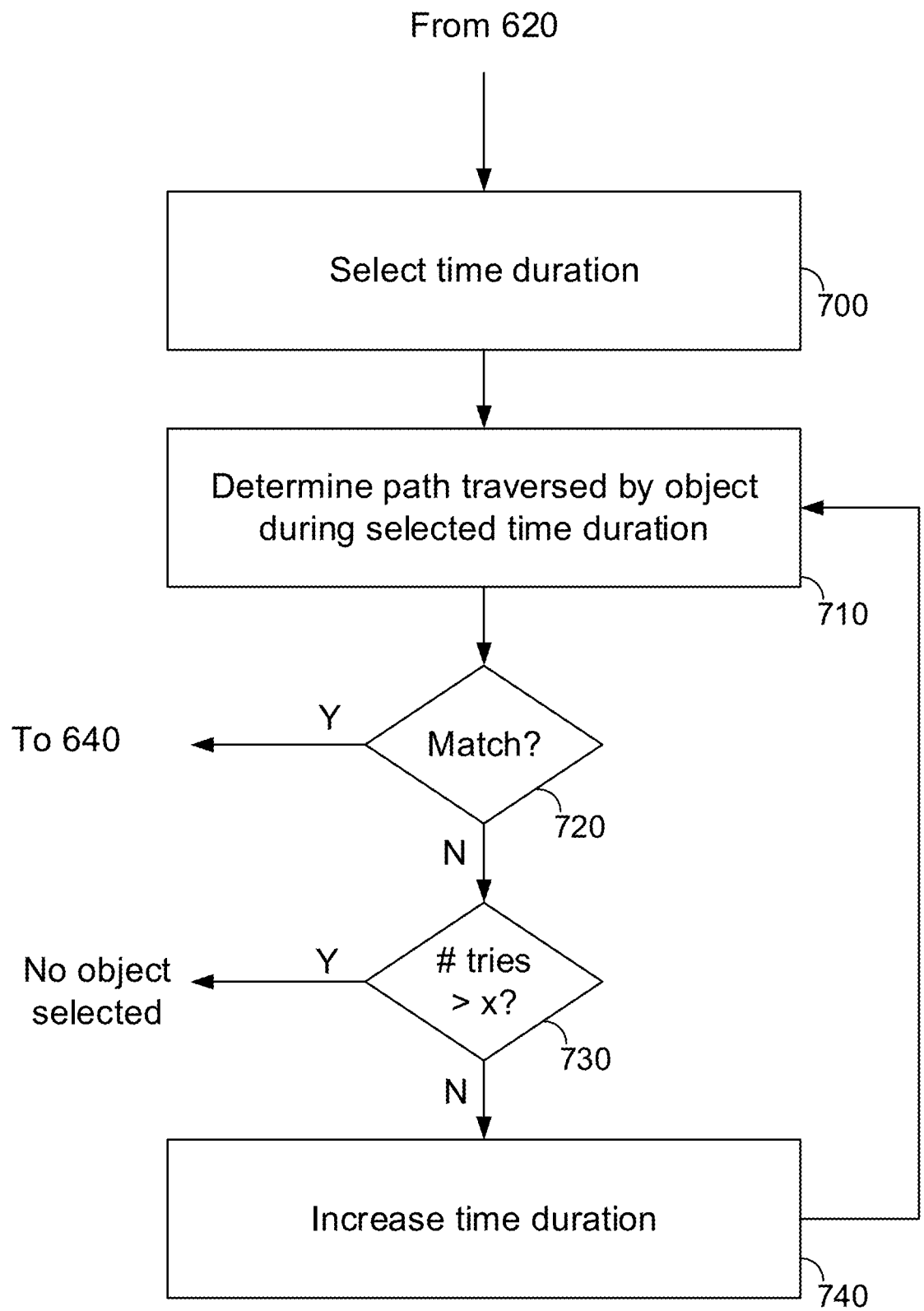
FIG. 7 is a flowchart illustrating processing steps for attempted matching between traced and traversed paths, in accordance with embodiments of the disclosure.

FIG. 7 is a flowchart illustrating processing steps for this procedure, in accordance with embodiments of the disclosure. The steps of FIG. 7 may be performed between Steps 620 and 630 of FIG. 6. In particular, once a comparison is performed between traced and traversed paths at Step 620, and no match is found, a time duration is selected (Step 700) that is greater than the time duration used in determining the traversed path used in the comparison of Step 620. Any suitable time duration is contemplated, e.g., 0.5 seconds greater than the time duration used previously. Object path determination module 414 then determines the paths traversed by displayed objects during this newly-selected time duration (Step 710). If a match is found between the traced path and one of these newly-determined traversed paths (Step 720), the process of FIG. 7 returns to Step 630, and the matched object is selected. Alternatively, if no match is found between the traced path and any of the newly-determined traversed paths (Step 730), the time duration is increased again (Step 740) and the process returns to Step 710 to conduct another comparison. This process may terminate after a predetermined number of attempts if desired, with a check performed at Step 730 to determine whether this predetermined number has been exceeded. If so, i.e., if the time duration has been successively increased a predetermined number of times with no match found between the traced path and any of the successively lengthened segments, the process may return a result of no object selected, terminating the comparison process of FIG. 6.

Figure 8:
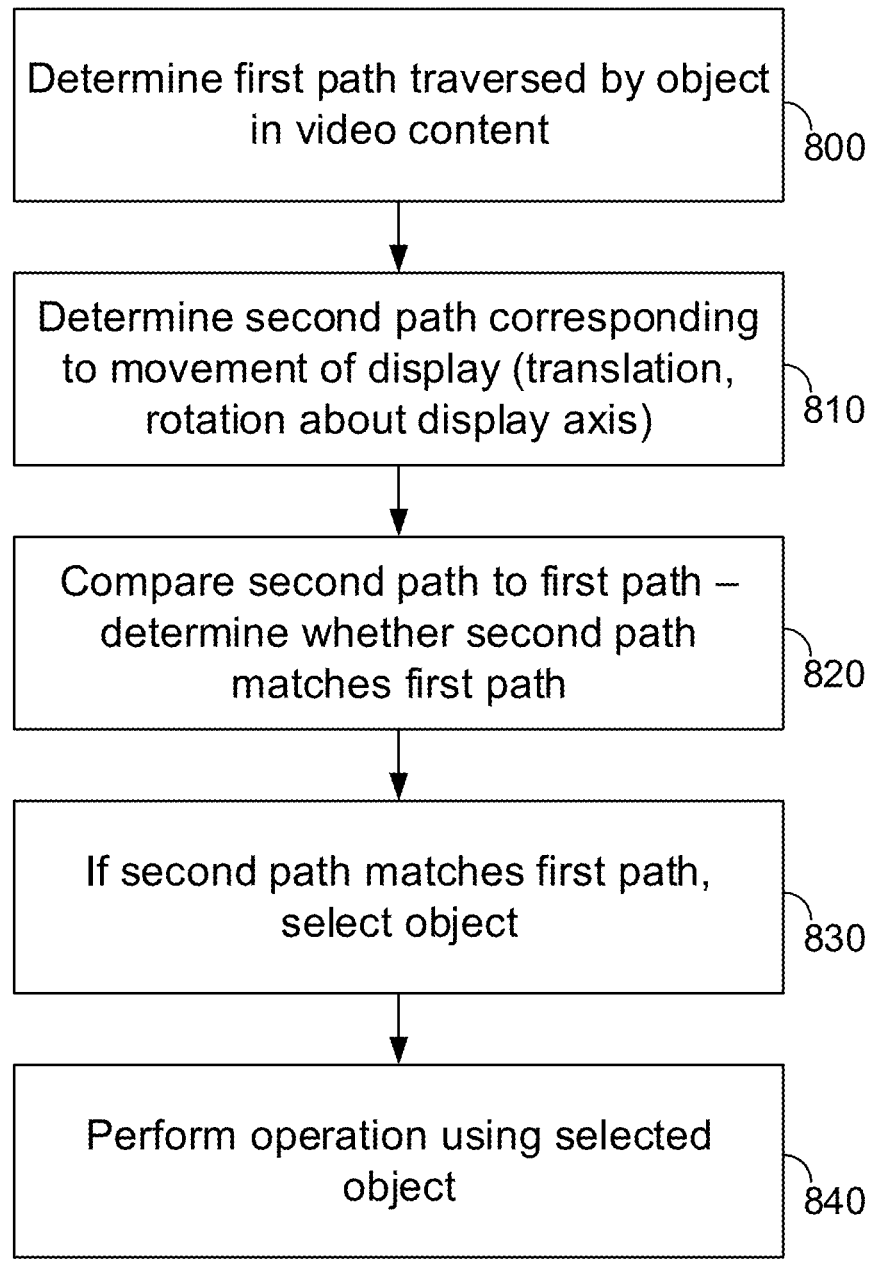
FIG. 8 is a flowchart illustrating processing steps for selection of displayed objects by path tracing, in accordance with further embodiments of the disclosure.

As above, users may trace paths in any manner, such as by touches upon a touch-sensitive display 20, or movement of a motion-sensitive display. FIG. 8 is a flowchart illustrating processing steps for selection of displayed objects by display movement, in accordance with further embodiments of the disclosure. Here, an exemplary process may begin when the object path determination module 414 determines first paths traversed by objects in video content (Step 800), similar to Step 600 of FIG. 6. As above, these paths may be determined prior to content display, with determined paths stored as metadata of their corresponding content, or may be determined in substantial real time as content is played.

Users may then enter second paths via movement of display 10 (step 810), such as by rotating and/or translating a motion-sensitive device 10 about any of its axes to move a cursor and thus trace a path. This second traced path may then be compared to the first paths determined by object path determination module 414, to determine whether the first path matches any of the second paths (step 820). If any such second path sufficiently matches the first path, the display 10 may select the object (Step 830), whereupon an operation may be performed involving the selected object (Step 840). The process of FIG. 8 may be similar to the process described in connection with FIG. 6, with the exception of the manner by which the user inputs a traced path.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, traced paths may be entered by a user in any manner, such as by touch, mouse, or manipulation of the display itself. Traced paths may be compared to traversed paths in any manner, whether by comparison of constituent shapes of the various paths, distances between corresponding points of the paths, or any other suitable method. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method of selecting a displayed object, the method comprising:
   using control circuitry, determining an object path traversed by an object in video content provided on a video portion of a display, wherein the determining the object path traversed further comprises:
      selecting a time duration; and
      determining the object path traversed by the object along a first portion of the display during the selected time duration;
   receiving an input path traced upon a second portion of the display, wherein the input path traced upon the second portion of the display is different in orientation from the object path traversed along the first portion of the display and wherein each of the first portion of the display and the second portion of the display overlaps at least a portion of the video portion of the display;
   comparing the object path traversed along the first portion of the display to the input path traced along the second portion of the display, to determine whether the input path traced matches the object path traversed;
   in response to determining that the input path traced matches the object path traversed:
      selecting the object;
   in response to determining that the input path traced does not match the object path traversed:
      (a) increasing the time duration;
      (b) determining the object path traversed by the object during the increased time duration;
      (c) comparing the input path traced to the object path traversed by the object during the increased time duration, to determine whether the input path traced matches the object path traversed by the object during the increased time duration; and
   in response to determining that the input path traced matches the object path traversed by the object during the increased time duration, selecting the object; and
   performing an operation using the selected object.

2. The method of claim 1, wherein, if the input path traced does not match the object path traversed by the object during the increased time duration, repeating (a), (b), and (c) in order.

3. The method of claim 1, further comprising storing the object path traversed as metadata of the video content.

4. The method of claim 1:
   wherein the comparing further comprises determining a shape of the object path traversed, and a shape of the input path traced; and
   wherein the determining whether the input path traced matches the object path traversed further comprises determining whether the shape of the input path traced matches the shape of the path traversed.

5. The method of claim 1, wherein the input path traced is a path traced by a contact upon the display.

6. The method of claim 1, wherein the object path traversed is a path extending along a first direction, and wherein the input path traced is a path extending along a second direction different from the first direction.

7. The method of claim 1, wherein the determining the object path traversed is performed during display of the video content.

8. The method of claim 1, wherein the input path traced is a path traced upon the object path traversed.

9. The method of claim 1, wherein the object path traversed comprises a path between geographic locations occupied by an object in the video content.

10. A system for selecting a displayed object, the system comprising:
   a storage device; and
   control circuitry configured to:
      determine an object path traversed by an object in video content provided on a video portion of a display, wherein the determining the object path traversed further comprises:
         selecting a time duration; and
         determining the object path traversed by the object along a first portion of the display during the selected time duration;
      receive an input path traced upon a second portion of the display, wherein the input path traced upon the second portion of the display is different in orientation from the object path traversed by the object along the first portion of the display and wherein each of the first portion of the display and the second portion of the display overlaps at least a portion of the video portion of the display;
      compare object the path traversed along the first portion of the display to the path traced along the second portion of the display, to determine whether the input path traced matches the object path traversed;

in response to determining that the input path traced matches the object path traversed:
  select the object;
in response to determining that the input path traced does not match the object path traversed:
  (a) increase the time duration;
  (b) determine the object path traversed by the object during the increased time duration;
  (c) compare the input path traced to the object path traversed by the object during the increased time duration, to determine whether the input path traced matches the object path traversed by the object during the increased time duration; and
  in response to determining that the input path traced matches the object path traversed by the object during the increased time duration, select the object; and
perform an operation using the selected object.

11. The system of claim 10, wherein the control circuitry is further configured to, if the input path traced does not match the object path traversed by the object during the increased time duration, repeat (a), (b), and (c) in order.

12. The system of claim 10, wherein the control circuitry is further configured to store the object path traversed as metadata of the video content.

13. The system of claim 10:
  wherein the comparing further comprises determining a shape of the object path traversed, and a shape of the input path traced; and
  wherein the determining whether the input path traced matches the object path traversed further comprises determining whether the shape of the input path traced matches the shape of the object path traversed.

14. The system of claim 10, wherein the input path traced is a path traced by a contact upon the display.

15. The system of claim 10, wherein the object path traversed is a path extending along a first direction, and wherein the input path traced is a path extending along a second direction different from the first direction.

16. The system of claim 10, wherein the determining the object path traversed is performed during display of the video content.

17. The system of claim 10, wherein the input path traced is a path traced upon the object path traversed.

18. The system of claim 10, wherein the object path traversed is a path along a first portion of the display, and wherein the input path traced is a path traced along a second portion of the display that is different from the first portion.

19. The system of claim 10, wherein the object path traversed comprises a path between geographic locations occupied by an object in the video content.

* * * * *